Figure 1:
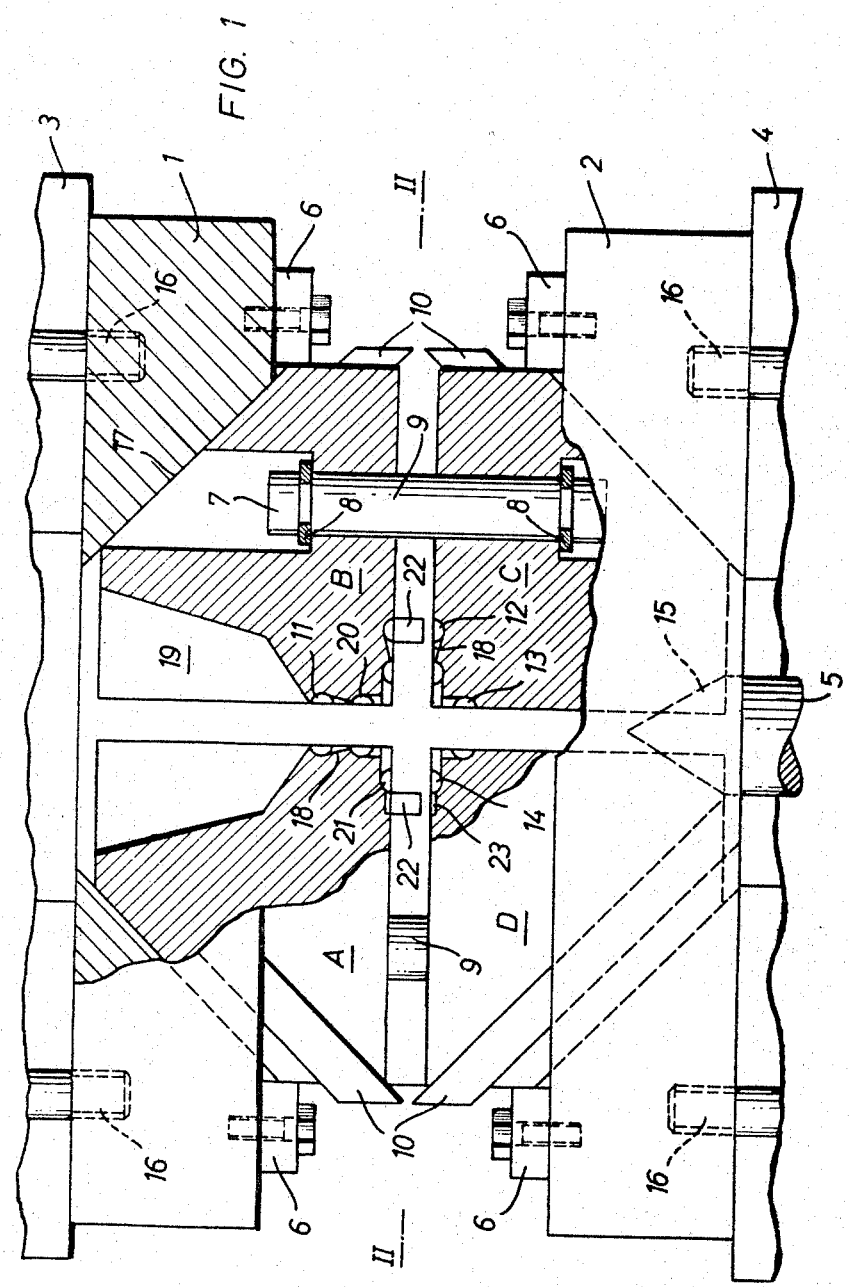

Aug. 1, 1967 P. FLORJANCIC 3,333,299
APPARATUS FOR THE CONTINUOUS MANUFACTURE OF CHAINS
Filed May 14, 1964 3 Sheets-Sheet 2

Inventor
Peter Florjancic
By Stevens, Davis, Miller & Mosher
Attorneys

Aug. 1, 1967 P. FLORJANCIC 3,333,299
APPARATUS FOR THE CONTINUOUS MANUFACTURE OF CHAINS
Filed May 14, 1964 3 Sheets-Sheet 3
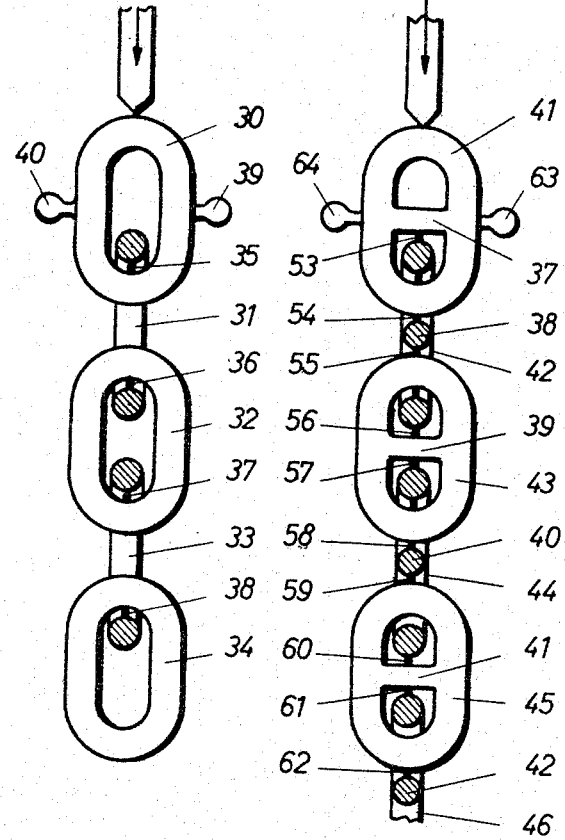
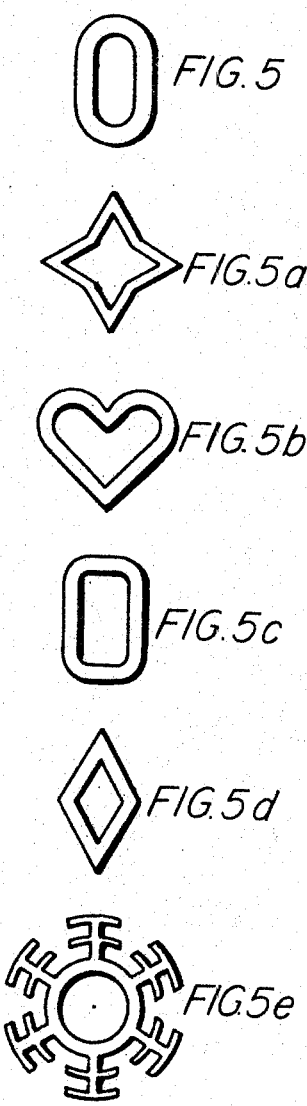
Inventor
Peter Florjancic
By Stevens, Davis, Miller & Mosher
Attorneys 3,333,299
APPARATUS FOR THE CONTINUOUS MANUFACTURE OF CHAINS
Peter Florjancic, Villach, Austria, assignor to Geimuplast Peter Mundt KG, Garmisch-Partenkirchen, Germany
Filed May 14, 1964, Ser. No. 367,333
Claims priority, application Germany, May 27, 1963, G 37,827; July 5, 1963, G 38,109
6 Claims. (Cl. 18—42)

This invention relates to an apparatus for the continuous manufacture of chains made from injection-moldable or castable material, such as plastics material or cast aluminum, which apparatus comprises four mold sections consisting of followers, which are adapted to be closed.

An apparatus of this type has already been disclosed for the continuous manufacture of chains. In this apparatus, a chain link is injection-molded first in one parting plane defined by the four followers, which are adapted to be closed. The followers are then opened and the completely molded chain link is placed into correspondingly shaped recesses of the other parting plane defined by the followers. When the followers have been closed again, another chain link is injection-molded in the first mentioned parting plane defined by said followers, this link is joined to the previously molded chain links owing to a suitable relative arrangement of the recesses in the two parting planes. The process is then continued as described so that a continuous chain can be made. The mode of operation of this previously proposed apparatus is considerably adversely affected by the fact that each chain link must be gripped and re-arranged in the other parting plane. The prior apparatus cannot be used with the commercially available injection molding machines without additional control and locking devices. Hence, specially designed injection molding machines are required.

It is an object of the present invention to provide an apparatus for the continuous manufacture of chains made from injection-moldable or castable material, such as plastics material or cast aluminum, which apparatus can be clamped on the commercially available injection molding machines without need for additional control and locking means. At the same time the continuous manufacture of chains is to be simplified, accelerated and reduced in cost.

In an apparatus of the kind mentioned initially hereinbefore, the objects set forth are solved according to the invention in that at least two runners are provided in different angular positions corresponding to the desired shape of the chain, one half of one of these runners is disposed on each side of each of the parting planes defined by the followers, said runners open laterally into the recesses for molding the chain links, and the followers have at least in one parting plane in addition to the recess for molding the chain link a retaining recess, which conforms to the upper half of a chain link and is disposed below the recess for molding the chain link at a distance which corresponds to the chain link molded in the angularly spaced parting plane. The apparatus designed according to the invention has the advantage that the previously molded chain links need not be angularly re-arranged after each molding operation. Besides, each molding operation results in at least two chain links rather than the single link produced in the prior apparatus. It is even possible to make four chain links at the same time in one molding operation.

In a development of the invention, one of the two runners is connected to a pot for injecting in a vertical direction and the other runner is connected to a pot for injecting at an angle to the injecting direction of the first pot. This development of the invention has the advantage that the chain can be made in two colors because two successive chain links are connected to different runners and different pots so that the latter can be charged with materials in different colors.

In a particularly desirable development of the invention, the followers are formed in both parting planes with recesses for molding at least two chain links, which recesses are disposed one below the other and have a common runner in each parting plane. This design of the followers has the advantage that all chain links which are molded in one operation in one parting plane are rigidly interconnected by a rodlike lug. This promotes a satisfactory dropping of the molded chain links out of the followers when the same are opened because the interconnected chain links have a heavier weight and cannot collapse.

To remove the lug from the chain links, the invention suggests to form the followers in their lower part on both sides of the parting planes with recesses for the passage of the interconnected, molded chain links and their rodlike lugs, and with a stop for at least one rodlike sprue, which stop is disposed in the upper portion of the followers and spaced from the retaining recess by a distance corresponding to the molded chain links, as well as with severing means, such as knives, for severing the lateral lugs of the chain links. In conjunction with the guide recesses for the passage of the chain links, the stop for the rodlike lug ensures that the last chain link molded in one molding operation will be exactly received by the retaining recess when the followers are closed so that the chain links to be made during the succeeding molding operation will be connected to the previously made chain links. The provision of the severing means, such as knives, in the followers themselves has the advantage that the closing movement of the injection molding machine can be utilized for severing the lug from the chain links.

A further improvement of the apparatus according to the invention resides in that the recesses formed in the followers and serving to receive the last of the chain links to be coherently molded have a dead-ended extension on the side opposite to the runner and the followers have in their lower portion another stop associated with said extension. This enables an exact guidance of the chain links in the vertical direction so that the satisfactory, automatic dropping of the chain links from the followers is promoted.

The severing means, such as knives, may be readjustable and/or exchangeable. If the cutting edges of the severing means become worn or blunt in the course of time, as is to be expected particularly when the plastic material composition is reinforced with fibers, the severing means may be re-adjusted or even exchanged.

To assist the severing movement, the severing means may be arranged for a movement independent of the followers. This may be achieved by the provision of a stop, which is engageable by the severing means during the return stroke of the movable part of the injection molding machine.

The suggestion of the invention that the lug of the chain links should be automatically separated may alternatively be realized in that guide passages for the molded and interconnected chain links are provided in different angular positions below the followers, and severing means, such as knives, for severing the lugs from the chain links, are disposed in said passages. The cutting edges of the severing means are desirably arranged to face the followers. Being separate from the followers, the guide passages may be stationary. The severing of the lug is effected by pulling through the chain links in a suitable manner between the cutting edges of the severing means.

The adaptation of the apparatus according to the invention to commercially available injection molding machines is enabled in that each follower housing accommodates two followers, one follower housing is adapted to be secured to the stationary part and the other follower housing is adapted to be secured to the movable part of a commercially available injection molding machine.

Another important feature of the novel apparatus resides in that the opening and closing movements of the followers are automatically coupled to the similar movements of the injection molding machine. This eliminates the need for a separate drive for the opening and closing movements of the followers. This is another advantage which is afforded by the invention and of high significance in practice.

The last-mentioned feature of the invention may be embodied in various forms. In a particularly simple and desirable arrangement, the follower housings and the followers are provided with means for guiding each other, such as ribs and grooves, which means extend outwardly from the center of the housing at an angle of preferably 45° to vertical planes extending through the follower housings, two opposite followers belonging to different follower housings are positively guided in their lateral movement by guide means, such as a guide rod and a guide bore, and the followers arranged in the follower housing secured to the movable part of the injection molding machine are formed on their rear side on both sides of the parting planes with a wedge-shaped groove, which is engaged by a wedge-shaped stop carried by the injection molding machine and causes the followers to open in response to the opening movement of the movable part of the injection molding machine.

In another embodiment, the follower housings and the followers are also provided with means for guiding each other, such as ribs and grooves, which means extend outwardly from the center of the housing at an angle of preferably 45° to vertical planes extending through the follower housings, two opposite followers belonging to different follower housings are positively guided in their lateral movement by guide means, such as a guide rod and a guide bore, and, different from the previously described embodiment, the guide rods are provided at their end with limiting stops, which engage corresponding stops in the guide bores after a partial opening movement of the follower housing. As the opening movement of the follower housing is continued, the followers associated with this follower housing are carried along and will automatically and uniformly open the opposite followers by the guide means which have been provided.

The invention relates also to a method for the continuous manufacture of chains or other connected articles made from injection-moldable or castable material, such as plastics material or cast aluminum, which method is characterized in that the chain links are initially injection-molded in pairs of links having different angular positions and in such a manner that all chain links molded in one operation are rigidly interconnected by lugs, whereafter the lugs on the chain links are severed. In a development of the method according to the invention, the lug is molded directly between two adjacent chain links having different angular positions and is severed from at least one of the adjacent chain links, e.g., by bending the chain links relative to each other, or by exerting tension in opposite direction on the chain links, or by cutting. This method is particularly suitable for the manufacture of ornamental chains, which may be used for numerous purposes. By ways of example, bounding and marking chains and chains for air-permeable door curtains for use on hot days, particularly in southern countries, may be mentioned.

The chains made according to the invention are desirably injection-molded from polystyrene or nylon because the lugs can simply be broken off when these materials are used. Hence, the method according to the invention enables an inexpensive mass production of chains for a virtually unlimited field of application.

In a desirable development of the method according to the invention, the first of the chain links made in one operation is molded with a lateral lug on each side. By these lugs, the chain links molded in one operation are held in such a position that the last of these chain links can be molded together with the first of the chain links to be molded in the following operation.

Figure 2:
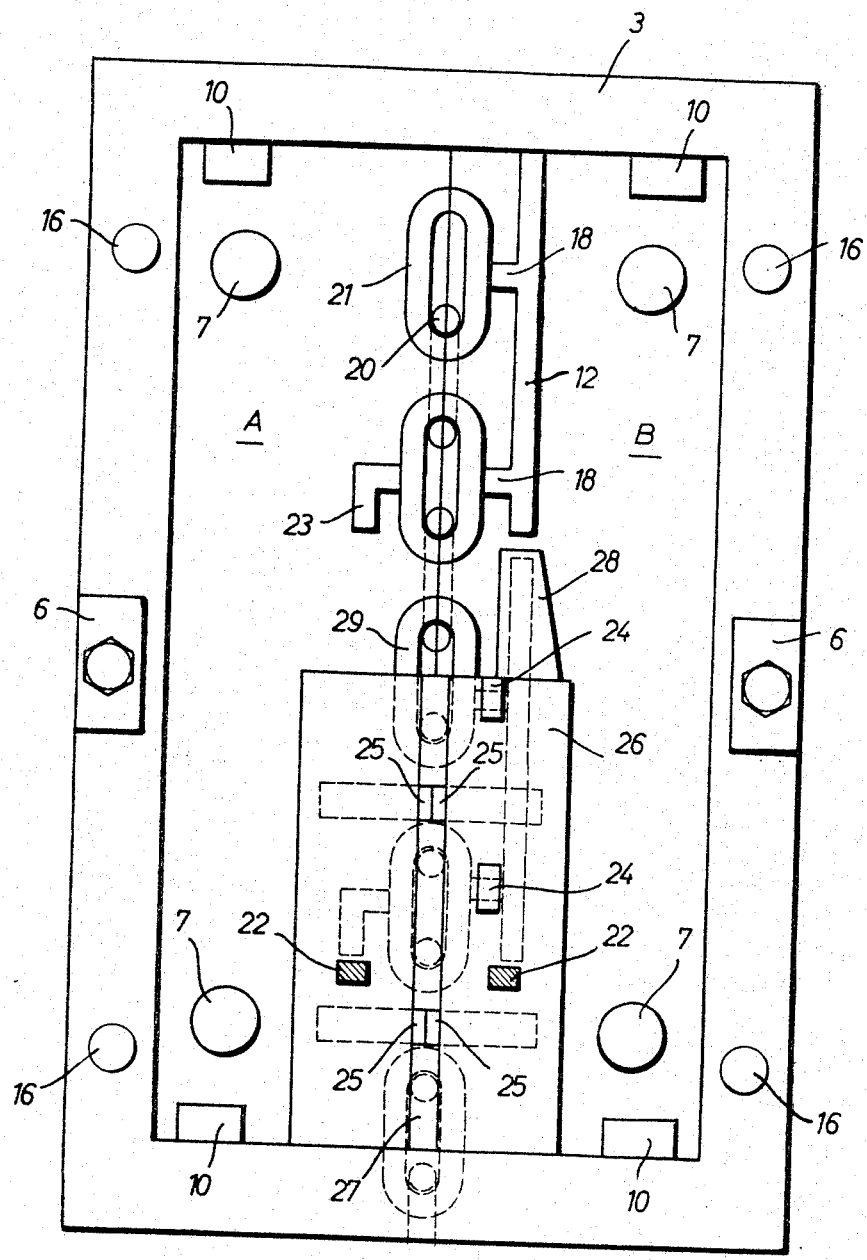

Various embodiments of the invention will be explained by way of example in the following description with reference to the drawings, in which FIG. 1 is a top plan view, partly in section, showing the apparatus according to the invention with the followers open, FIG. 2 is a sectional view taken on line II—II in FIG. 1, FIG. 3 shows an embodiment of chains made according to the invention, FIG. 4 shows another embodiment of the chains made according to the invention, and FIGS. 5–5e show individual chain links having different shapes.

The follower housing 1 is secured by means of screws 16 in a vertical plane to the stationary part 3 of a normal injection molding machine. The follower housing 2 is similarly secured to the movable part 4 of this machine. The follower housing 1 contains the followers A and B and the follower housing 2 contains the followers C, D. The follower housings 1, 2 and the followers A, B, C, D are provided with means 10 for guiding each other. These means consist of ribs and grooves and extend outwardly from the center of the housing at an angle of 45° to vertical planes extending through the follower housings. Two opposite followers, namely A and D, on the one hand, and B and C, on the other hand, are positively guided in their lateral movement by guide means 9 and 7, 8, respectively. In one embodiment, the guide means comprise a simple, cylindrical guide rod 9, which is disposed in a corresponding cylindrical bore of a follower. In this embodiment the followers C, D disposed in the follower housing secured to the movable part 4 of the injection molding machine form on their rear side on both sides of their parting plane a wedge-shaped groove 15, which is engaged by a stationary, wedge-shaped stop 5 secured to the injection molding machine. During the opening movement of the movable part 4 of the injection molding machine this stop causes an opening movement of the followers C, D and A, B.

In another embodiment, the guide means comprise guide rods 7 and limiting stops 8 secured to the ends of said rods. After a partial opening movement of the follower housing 2, the stops 8 engage corresponding stops in the guide grooves of the followers. A continued opening movement of the follower housing 2 will then positively result in a uniform opening movement of all followers A, B, C, D.

In that embodiment in which the guide means consist of simple cylindrical pins 7, lateral limiting cams 6 are provided, which serve as a limiting stop for the lateral opening movement of the followers.

The followers A, B facing the stationary part 3 of the machine have on their rear on both sides of the parting plane a double-conical bore 19 for receiving that injecting nozzle which is connected to the pot arranged for injecting in a horizontal plane. Another injection nozzle, which is connected to a pot arranged to inject in a vertical plane, is connected to the runner 12 formed in the follower B, as is apparent from FIG. 2. Each of the gates 18 connected to the runner 12 opens into a recess 21 for molding one chain link. In the follower A, that recess 21 which receives the last of a series of links to be molded in open operation, in FIG. 2 the lower recess, has on the side opposite to the gate 18 a dead-ended, downwardly angled extension 23, which terminates in the same horizontal plane as the runner 12. In the parting plane which is apparent from FIG. 2, the followers have a retaining recess 29 in addition to the recesses 21 for molding the chain links. The shape of the retaining recess conforms to the upper half of a chain link. The recess 29 is spaced below the recesses 21 for molding the chain links at a distance corresponding to a chain link 20 molded in the other parting plane. Such a chain link 20 is indicated in dash lines in FIG. 2. As is readily apparent from FIG. 2, the followers are formed adjacent to each of their parting planes with recesses 21 for molding at least two chain links, and a common runner 12 is provided in each parting plane for these recesses.

The common runner for the chain links 20, which are molded in the parting plane which is at right angles to FIG. 2, is apparent at 11 in FIG. 1. It will be understood that in a modified embodiment, not shown, the runner 11 may extend vertically upwardly, just as the runner 12 in FIG. 2. In this case the cone 19 for receiving the injecting nozzle of a pot for injecting into a horizontal plane is omitted. In this embodiment, both runners 11 and 12 for the two parting planes may be charged by a double nozzle from one sprue.

In their lower part, which is apparent from FIG. 2, the followers are formed on both sides of the parting planes with recesses 26 and 27 for the passage of the molded, interconnected chain links and their lugs. These links have been molded in the recesses 20 and 21 and the lugs in the channels 11, 12, and 23. The recesses 26 and 27 contain stops 22, which are spaced by a distance selected in accordance with the molded chain links so that the stops 22 are engaged by the lower ends of the lugs of the chain links. These lugs are indicated in dash lines in FIG. 2. As is apparent from the dash line showing in FIG. 2 of the molded chain links, which have already dropped by gravity, the stops ensure that the chain link molded last fits exactly the retaining recess 29. The recesses 26 and 27 are upwardly continued by further recesses 28 so that the rodlike lug resting on the stop 22 will not interfere with the closing movement of the followers. Severing means 24 for one parting plane and severing means 25 for the other parting plane are provided in the lower portion of the followers on the level of the gates 18 and of the dead-ended extension 23. As the followers are being closed, these severing means 24 and 25 sever all lugs from the chain links 20 and 21 so that chain links ready for use leave the apparatus according to the invention after alternate opening movements.

From the foregoing description of the invention, a person having average skill in the art will readily understand that the apparatus according to the invention may also be used for the continuous manufacture of connected articles other than chains. Hence, the invention is not restricted to the continuous manufacture of chains but covers the apparatus defined in the subsequent claims also when the same is used for making articles other than chains.

FIG. 3 shows a portion of a chain which consists of the chain links 30 to 34. The chain links 31 and 33 are disposed at an angle to the chain links 30 and 32. Two adjacent chain links in different angular positions, e.g., the chain links 30 and 31 or the chain links 31 and 32, are rigidly interconnected at adjacent inside surfaces by a lug 35 or 36 or 37 or 38. In each molding operation, a rigid portion of the chain to be made leaves the mold. The last chain link which leaves the mold, in the embodiment shown in FIG. 3 the chain link 30, is molded on each side with a lateral lug 39 or 40. With these lugs, the chain links molded in one operation engage stops disposed in or below the molding machine. The stops are arranged to ensure that the chain link adjacent to the chain link 30 will be molded around the latter in a different angular position in the next molding operation. The chains thus made consist of polystyrene or nylon and their lugs may be severed by a relative bending of the individual chain links. This operation does not require special tools and results in a chain having relatively movable, individual links. This chain is ready for sale. In a further operation, the remaining lug may be removed but this is not necessary for numerous applications.

The method acocrding to the invention may also be employed to make chains of the type shown in a fragmentary view in FIG. 4. Each of the chain links 41 to 46 has been molded with a central cross-web 37 to 42. The chain links having different angular positions are connected by lugs 53 to 62, which extend from the cross-webs. The molding operation results in this case also in a chain having rigidly connected links. The lugs are severed in a simple manner by exerting tension in opposite directions on the chain links. As can easily be imagined upon reference to the drawing, this will result in an elongation of the chain because the inside surfaces of alternate chain links engage the inside surfaces of the chain links having a different angular position. In this method too, the first of the chain links made in one operation, here the chain link 41, is molded on each side with a lateral lug 63, 64 for the purpose described with reference to FIG. 3.

What is claimed is:
1. Apparatus for the manufacture of chain links or like connected articles from injection-moldable or castable material, comprising a mold made from a plurality of relatively movable mold sections defining between them two intersecting parting planes which are substantially vertical when the apparatus is in its operating position, said mold sections being recessed to define at least two cavities interlinked vertically, the medial plane of each molding recess lying in one of the parting planes, at least one of the molding recesses having extending outwardly from it a further recess to define at least one positioning lug on the article formed when material is cast or molded in the recess, the molding recesses adapted to be placed in communication with an injection-molding or casting machine, and said mold sections being recessed to define a housing for at least part of a completed article, the housing being interlinked by a molding recess but isolated from it.

2. The apparatus claimed in claim 1 in which the recesses lying in one parting plane are in communication with the exterior of the mold through a passageway which is not parallel with a like passageway in communication with a recess lying in the other parting plane.

3. The apparatus claimed in claim 2 in which one of the passageways is substantialy vertical when the mold is in its operating position.

4. The apparatus claimed in claim 1 in which at least one of the parting planes intersects two molding recesses spaced apart from each other, but both interlinked by a molding recess having its medial plane lying in the other parting plane.

5. The apparatus claimed in claim 1 in which the mold sections define at least one additional recess positioned below the said housing when the mold is in its operating position, said additional recess being formed by at least two of the mold sections, at least one wall of said additional recess having at least one knife projecting from it and positioned to sever part of a molded or cast article after its ejection from the molding recesses when the sections are moved towards each other for a following molding or casting operation.

6. The apparatus claimed in claim 5, in which at least one stop projects into the interior of said additional recess, the stop being positioned to be engaged by part of a molded or cast article when at least part of another interconnected article is housed within the said housing.

(References on following page)

References Cited

UNITED STATES PATENTS

| | | | |
|---|---|---|---|
| 923,521 | 6/1909 | Herron | 249—57 |
| 2,051,653 | 8/1936 | Rich | 249—57 |
| 2,266,433 | 12/1941 | Morin | 18—42 |
| 2,388,986 | 11/1945 | Morin | 264—242 XR |
| 2,498,031 | 2/1950 | Deiss | 249—57 |
| 2,904,845 | 9/1959 | Sperry | 264—242 |
| 2,914,805 | 12/1959 | Morin | 18—42 |
| 3,154,615 | 10/1964 | Cooprider | 264—242 |

J. SPENCER OVERHOLSER, *Primary Examiner.*

ROBERT F. WHITE, *Examiner.*

WILBUR L. McBAY, R. B. MOFFITT,
*Assistant Examiners.*